(12) United States Patent
Draenkow et al.

(10) Patent No.: US 11,988,457 B2
(45) Date of Patent: May 21, 2024

(54) COAXIAL TUBE ARRANGEMENT

(71) Applicant: Mahle International GmbH, Stuttgart (DE)

(72) Inventors: Andreas Draenkow, Heimsheim (DE); Timo Feldkeller, Asperg (DE); Thomas Merten, Knittlingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 17/895,031

(22) Filed: Aug. 24, 2022

(65) Prior Publication Data
US 2023/0064641 A1 Mar. 2, 2023

(30) Foreign Application Priority Data
Aug. 25, 2021 (DE) .................... 10 2021 209 342.6

(51) Int. Cl.
| | |
|---|---|
| *F28D 7/10* | (2006.01) |
| *F16L 9/19* | (2006.01) |
| *F28D 1/053* | (2006.01) |
| *F28D 1/02* | (2006.01) |

(52) U.S. Cl.
CPC ............. *F28D 7/106* (2013.01); *F16L 9/19* (2013.01); *F28D 1/05341* (2013.01); *F28D 2001/0266* (2013.01)

(58) Field of Classification Search
CPC .............. F28F 7/10; F28F 7/103; F28F 7/106
See application file for complete search history.

(56) References Cited

U.S. PATENT DOCUMENTS

| | | | | |
|---|---|---|---|---|
| 2,155,666 | A | * | 4/1939 | Leidig ...................... F28F 1/02 |
| | | | | 165/157 |
| 3,399,720 | A | * | 9/1968 | Doelz ..................... F28D 7/106 |
| | | | | 165/166 |
| 4,094,358 | A | | 6/1978 | Neveux |

FOREIGN PATENT DOCUMENTS

| | | |
|---|---|---|
| DE | 2612416 A1 | 10/1976 |
| FR | 2860288 A1 | 4/2005 |
| JP | 2000205786 A | 7/2000 |
| JP | 2008134003 A | 6/2008 |

OTHER PUBLICATIONS

English abstract for FR-2 860 288.
German Search Report for DE-102021209342.6, dated Jan. 27, 2022.

* cited by examiner

*Primary Examiner* — Eric S Ruppert
(74) *Attorney, Agent, or Firm* — Fishman Stewart PLLC

(57) ABSTRACT

A coaxial tube arrangement for a heat exchanger may include a coaxial tube and a closing cover. The coaxial tube may include an inner core channel and an outer annular channel. The closing cover may close the coaxial tube at a longitudinal end side. The closing cover may have a base region and a circumferential edge. The base region may be aligned transversely to a flow direction through the coaxial tube. The circumferential edge may be aligned with the flow direction and may face the coaxial tube. The circumferential edge may have a thickness, which is defined transversely to the flow direction, that is equal to or greater than a height of the annular channel, which is defined transversely to the flow direction. The circumferential edge may cover the annular channel transversely to the flow direction and may separate the annular channel from the core channel in a fluid-tight manner.

20 Claims, 5 Drawing Sheets

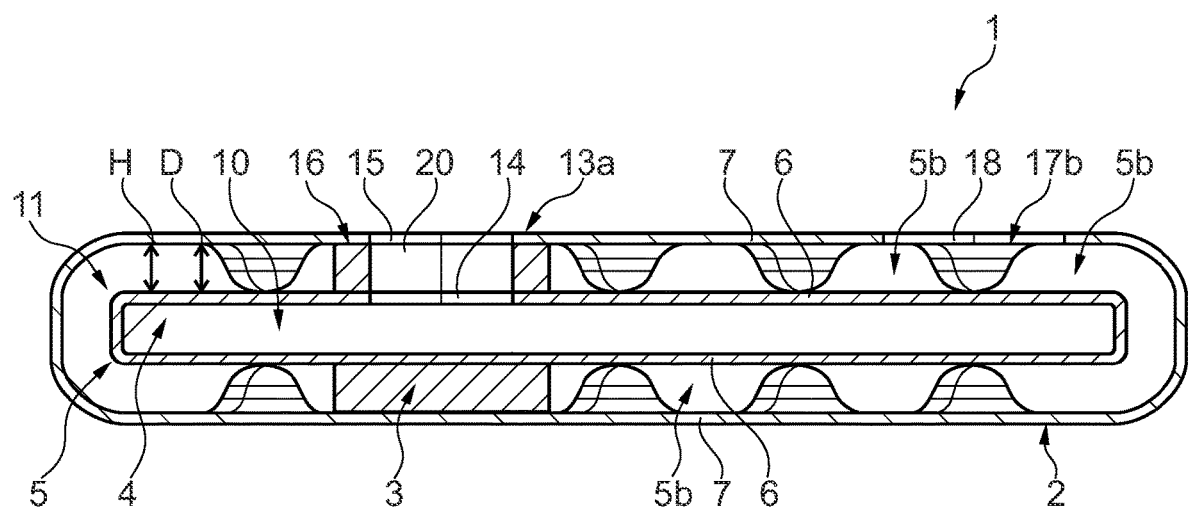
Fig. 10 (A-A)

COAXIAL TUBE ARRANGEMENT

CROSS-REFERENCE TO RELATED APPLICATIONS

This application claims priority to German Patent Application No. DE 10 2021 209 342.6, filed on Aug. 25, 2021, the contents of which is hereby incorporated by reference in its entirety.

TECHNICAL FIELD

The invention relates to a coaxial tube arrangement.

BACKGROUND

Coaxial tubes are already known from the prior art which have an inner core channel and an outer annular channel. The core channel and the annular channel are able to be flowed through here by two different fluids. The coaxial tube can be closed in a fluid-tight manner on the longitudinal end side, wherein the core channel is closed with a base and the annular channel is closed by a cover. As the base and the cove are usually configured in a flat manner, the coaxial tube arrangement does not have too high a strength. In addition, through the large number of individual parts, the number of soldered connections is increased, whereby the tightness of the coaxial tube arrangement can be impaired. In addition, the coffering process of the coaxial tube arrangement is laborious.

SUMMARY

It is therefore the object of the invention to indicate, for a coaxial tube arrangement of the generic type, an improved or at least alternative embodiment, in which the described disadvantages are overcome.

This problem is solved according to the invention by the subject matter of the independent claim(s). Advantageous embodiments are the subject matter of the dependent claim(s).

The present invention is based on the general idea, in a coaxial tube arrangement with a coaxial tube and a closing cover, of providing the closing cover with a thickened wall, so that the thickened wall can close an annular channel of the coaxial tube transversely to its extent. A coaxial tube arrangement according to the invention has a coaxial tube with an inner core channel and an outer annular channel. The coaxial tube arrangement has in addition at least one closing cover, which closes the coaxial tube at the longitudinal end side. The at least one closing cover has here a base region aligned transversely to the flow direction which is present in the coaxial tube, and a circumferential edge aligned in flow direction and facing the coaxial tube. According to the invention, a defined thickness of the circumferential edge of the at least one closing cover, transversely to the flow direction, is equal to or greater than a defined height of the annular channel transversely to the flow direction in the coaxial tube. A thickness of the circumferential edge running in radial direction of the coaxial tube is thus greater than or equal to a height of the annular channel running in radial direction, and therefore able to be pressed into the latter in a tight manner. In particular, the thickness of the circumferential edge of the at least one closing cover can be identical to the defined height of the annular channel transversely to the flow direction in the coaxial tube. The circumferential edge of the at least one closing cover covers here the annular channel transversely to the flow direction and separates the annular channel from the core channel in a fluid-tight manner.

The circumferential edge runs around the base region on the edge side and projects from the base region in flow direction. The circumferential edge of the closing cover faces the annular channel here and is arranged lying opposite the annular channel in flow direction. As the thickness of the circumferential edge of the closing cover is equal to or greater than the height of the annular channel, the circumferential edge covers the annular channel transversely to the flow direction. When the closing cover is arranged on the coaxial tube, the annular channel of the coaxial tube is closed with the circumferential edge of the closing cover in a fluid-tight manner and is separated from the core channel in a fluid-tight manner. The base region of the closing cover accordingly closes the core channel of the coaxial tube toward the exterior.

In the coaxial tube arrangement according to the invention, the coaxial tube can therefore be closed in a pressure-resistant and process-reliable manner by the single closing cover and, at the same time, a separate fluid impingement of the core channel and of the annular channel of the coaxial tube can be realized. In addition, costs can be reduced, as the number of the individual parts in the coaxial tube arrangement is reduced. Furthermore, the required installation space can be reduced, the strength of the coaxial tube arrangement can be increased and the process reliability can be increased by a simplifying of the joining process.

The coaxial tube and the at least one closing cover can be metallic, in particular identical in material to the heat exchanger tube. The at least one closing cover can then be connected to the coaxial tube in a materially connected manner, preferably soldered. The at least one closing cover can be, for example, a deep-drawn part. The coaxial tube can be formed as an extruded profile, in particular made of aluminium, or as a welded tube.

The coaxial tube arrangement is provided for a heat exchanger and can form, for example, a heat exchanger block of the heat exchanger. Then in the coaxial tube, a first fluid can flow in the core channel and a second fluid in the annular channel and exchange heat with one another. The coaxial tube arrangement can then have two closing covers and be closed at the longitudinal end side on both sides with the closing covers. The two closing covers in the coaxial tube arrangement can then fluidically separate the annular channel from the core channel entirely. The two closing covers can be formed identically with respect to one another.

In an embodiment of the coaxial tube arrangement the circumferential edge of the at least one closing cover can be pushed into the annular channel in flow direction at least in part. The circumferential edge then lies transversely to the flow direction against an outer wall, running around the annular channel from the exterior, and against an inner wall running around the core channel from the exterior. Thereby, two contact faces, running around the core channel in an annular manner transversely to the flow direction are formed between the coaxial tube and the circumferential edge. At these contact faces, the at least one closing cover and the coaxial tube can be connected to one another in a materially connected manner—soldered, for example. The thickness of the circumferential edge can correspond or respectively be identical here to the height of the annular channel.

In an embodiment of the coaxial tube arrangement, provision can be made that the coaxial tube has an inner wall, running around the core channel from the exterior, and an outer wall, running around the annular channel from the exterior. The circumferential edge of the at least one closing cover is arranged here transversely to the flow direction at least in part between the inner wall and the outer wall. Thereby, the circumferential edge of the closing cover is in contact on one side with the outer wall of the coaxial tube and on the other side with the inner wall of the coaxial tube. At the said contact faces, the at least one closing cover can be connected to the coaxial tube in a materially connected manner—soldered, for example. The thickness of the circumferential edge can correspond or respectively be identical here to the height of the annular channel.

The coaxial tube arrangement can have a core channel inlet for letting in the first fluid into the core channel and a core channel outlet for letting out the first fluid out from the core channel. The core channel inlet and the core channel outlet can lead respectively via an inner wall opening in an inner wall and via an outer wall opening in an outer wall through the annular channel into the core channel. The outer wall runs around the annular channel from the exterior, and the inner wall runs around the core channel from the exterior. The annular channel is delimited here from the core channel by the inner wall and from the environment by the outer wall.

In addition, provision can be made that the circumferential edge of the at least one closing cover is arranged between the outer wall and the inner wall and has a through-opening for the core channel inlet or the core channel outlet. The through-opening correlates here, transversely to the flow direction, with the inner wall opening and with the outer wall opening of the core channel inlet or of the core channel outlet. In other words, the inner wall opening, the outer wall opening and the through-opening can be identical or nearly identical in size and can be arranged over one another transversely to the flow direction. The core channel inlet and the core channel outlet can then lead respectively via the outer wall opening, the through-opening and the inner wall opening through the annular channel into the core channel.

The circumferential edge of the at least one closing cover can run around the outer wall opening and the inner wall opening of the core channel inlet or of the core channel outlet and can separate the annular channel from the core channel inlet or the core channel outlet in a fluid-tight manner. The circumferential edge can lie here in a joining region, surrounding or respectively edging the through-opening, against the outer wall and against the inner wall and can be connected—soldered, for example—to the outer wall and to the inner wall in a fluid-tight materially connected manner. Thereby, the annular channel can be fluidically separated from the core channel. In other words, the through-opening of the at least one closing cover can fluidically connect the outer wall opening and the inner wall opening, and the joining region of the at least one closing cover can separate the annular channel from the core channel in a fluid-tight manner.

In a further development of the coaxial ring arrangement, provision can be made that the coaxial tube arrangement has an annular channel inlet for letting in the second fluid into the annular channel, and an annular channel outlet for letting out the second fluid from the annular channel. The annular channel inlet and the annular channel outlet then lead into the annular channel via an opening in an outer wall running around the annular channel from the exterior.

Advantageously, provision can be made that in the annular channel at least one separate turbulence insert is arranged and thereby at least two partial channels, aligned parallel to one another, are formed in the annular channel. The at least one turbulence insert can be metallic and can be connected in a materially connected manner—soldered, for example—to an outer wall running around the annular channel from the exterior and/or to an inner wall running around the core channel from the exterior.

Alternatively to the above solution, provision can be made that at least two nubs are formed in an outer wall which runs around the annular channel from the exterior, and thereby at least two flow paths, differing from one another, are formed in the annular channel. The nubs can be directed here from the outer wall to an inner wall running around the core channel from the exterior, and can thereby be directed transversely to the flow direction. Advantageously, the nubs can extend up to the inner wall and can rest against the inner wall. The nubs can be configured identically to one another or different from one another and can be formed in a regular or in an irregular pattern in the outer wall.

Alternatively to the above solutions, provision can be made that in the annular channel at least two ribs are formed and thereby at least two partial channels, aligned parallel to one another, are formed in the annular channel. The ribs can connect here to one another an outer wall, running around the annular channel from the exterior, and an inner wall, running around the core channel from the exterior. The ribs can be formed integrally here with the outer wall and with the inner wall or respectively formed from a common piece of material.

Through the at least two partial channels or respectively the at least two flow paths, the flow can be divided within the annular channel and thereby the heat transfer between the first fluid in the core channel and the second fluid in the annular channel can be intensified. Through the at least one turbulence insert or respectively the nubs or respectively the ribs, in addition an outer wall, running around the annular channel from the exterior, and an inner wall, running around the core channel from the exterior, can be arranged in a spaced manner. In other words, the distance between the outer wall and the inner wall can be defined or respectively maintained by the at least one turbulence insert or respectively the nubs or respectively the ribs.

Advantageously, provision can be made that in the core channel at least one separate turbulence insert is arranged and thereby at least two partial channels, aligned parallel to one another, are formed in the core channel. The at least one turbulence insert can be metallic and can be connected in a materially connected manner—soldered, for example—to an inner wall running around the core channel from the exterior.

Alternatively thereto, provision can be made that at least two rib portions are formed on an inner wall which runs around the core channel from the exterior, and thereby at least two partial channels, aligned parallel to one another, are formed in the core channel. The partial channels can be entirely separated from one another here in a fluid-tight manner by the rib portions, or can be fluidically connected to one another in part, transversely to the flow direction. The rib portions can be formed integrally with the inner wall or respectively can be formed from a common piece of material.

Through the at least two partial channels, the flow can be divided in the core channel and thereby intensified. Thereby, the heat transfer between the first fluid in the core channel and the second fluid in the annular channel can be advantageously improved.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained more closely in the following description, wherein the same reference numbers refer to identical or similar or functionally identical components.

BRIEF DESCRIPTION OF THE DRAWINGS

There are shown, respectively schematically,

FIG. 10 shows a sectional view of the coaxial tube arrangement in the third embodiment in a section plane A-A shown in FIG. 9.

DETAILED DESCRIPTION

Figure 1:
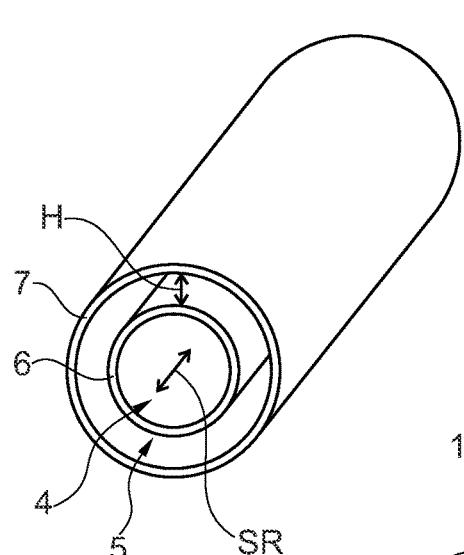
FIG. 1 shows a view of a coaxial tube of a coaxial tube arrangement according to the invention, in a first embodiment.
Figure 2:
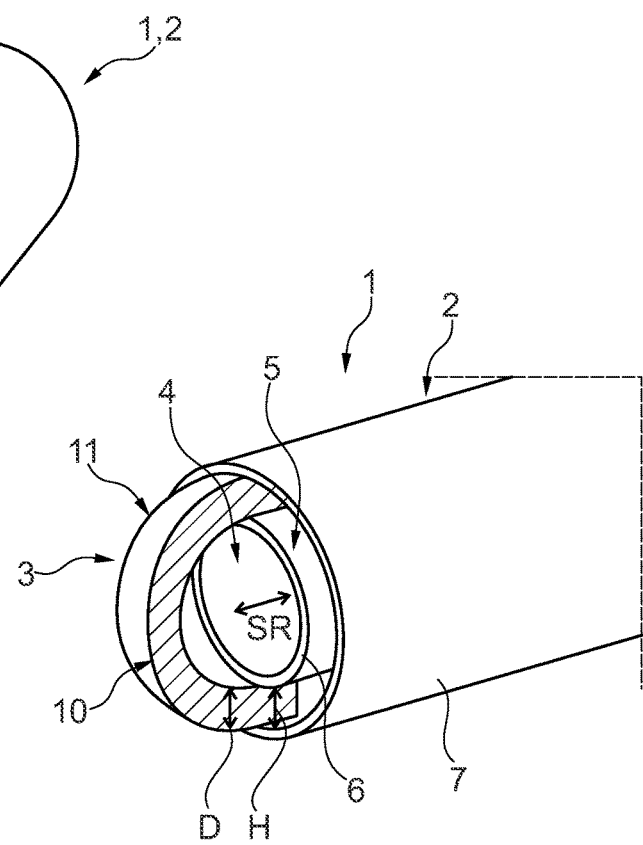
FIG. 2 shows a partial sectional view of the coaxial tube arrangement according to the invention in the first embodiment with the coaxial tube and with a closing cover.
Figure 3:
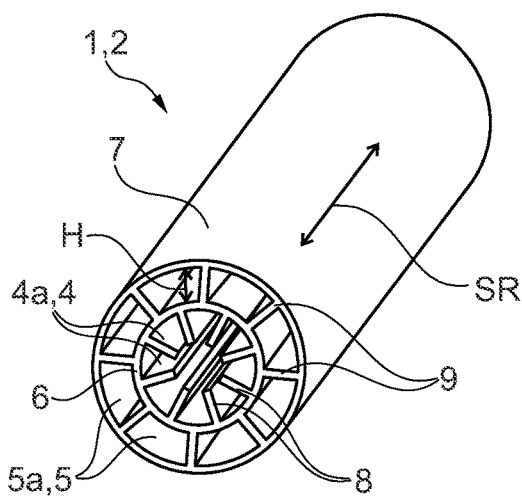
FIG. 3 shows a view of the differently configured coaxial tube of the coaxial tube arrangement according to the invention in the first embodiment.

FIG. 1-3 show a coaxial tube arrangement 1 according to the invention in a first embodiment. The coaxial tube arrangement 1 is provided here for a heat exchanger and has a coaxial tube 2 and a closing cover 3. In FIG. 1 a view of the coaxial tube 2 is shown. FIG. 2 shows a view of the coaxial tube arrangement 1 with the closing cover 3, wherein the closing cover 3 is shown partly in section, for clarity. FIG. 3 shows the differently configured coaxial tube 2.

The coaxial tube 2 of the coaxial tube arrangement 1 has here an inner core channel 4 and an outer annular channel 5. The annular channel 5 runs around the core channel 4 here from the exterior, in a direction transversely to a flow direction SR present in the coaxial tube 2. A height H of the annular channel 5 is defined transversely to the flow direction SR. The coaxial tube 2 can be metallic here and can be configured as an extruded profile or as a welded tube.

The core channel 4 and the annular channel 5 are delimited or respectively formed here by a tubular inner wall 6 and a tubular outer wall 7 of the coaxial tube 2. The inner wall 6 is arranged here coaxially in the outer wall 7. The inner wall 6 thus runs around the core channel 4 from the exterior, and the outer wall 7 runs around the annular channel 5 from the exterior. Here, the inner wall 6 separates the core channel 4 from the annular channel 5, and the outer wall 7 separates the annular channel 5 from the environment. The core channel 4 is provided for flowing through by a first fluid, and the annular channel 5 is provided for flowing through by a second fluid.

The inner wall 6 and the outer wall 7 are expediently arranged spaced apart from one another, wherein the height H of the annular channel 5 is predetermined through the distance of the inner wall 6 and the outer wall 7 with respect to one another. A defined diameter of the core channel 4 transverse to the flow direction is defined or respectively predetermined through an inner diameter of the inner wall 6. The height H of the annular channel and the diameter of the core channel 5 are constant here in and transversely to the flow direction SR.

With reference to FIG. 3, several rib portions 8 can be formed in the core channel 5, and several ribs 9 can be formed in the annular channel 4. The rib portions 8 divide the core channel 4 into several partial channels 4a, parallel to one another, and the ribs 9 divide the annular channel 5 into several partial channels 5a, parallel to one another, whereby the heat transfer between the two fluids in the core channel 4 and in the annular channel 5 can be improved. The rib portions 8 are formed here integrally on the inner wall 6, and the ribs 9 are formed integrally on the inner wall 6 and on the outer wall 7.

With reference to FIG. 2, the coaxial tube arrangement 1 has the closing cover 3. Here, the closing cover 3 closes the coaxial tube 2 at the longitudinal end side and fluidically separates the core channel 4 from the annular channel 5. The closing cover 3 has here a base region 10 and a circumferential edge 11. The base region 10 is aligned transversely to the flow direction SR and lies in flow direction SR opposite the core channel 4, so that the core channel 4 is delimited toward the exterior by the base region 10. The circumferential edge 11 is formed parallel to the flow direction SR and facing the annular channel 5. The circumferential edge 11 runs around the base region 10 here on the edge side and projects from the base region 10 in flow direction SR. The circumferential edge 11 lies in flow direction SR opposite the annular channel 5. A thickness D of the circumferential edge 11, defined transversely to the flow direction, corresponds to or respectively is equal here to the height H of the annular channel 5, so that the circumferential edge 11 covers, and thereby closes, the annular channel 5 transversely to the flow direction SR.

The circumferential edge 11 of the closing cover 3 is pushed into the coaxial tube 2 between the inner wall 6 and the outer wall 7 in flow direction SR and lies transversely to the flow direction SR between the inner wall 6 and the outer wall 7. As the thickness D of the circumferential edge 11 corresponds to or respectively is equal here to the height H of the annular channel 5, the circumferential edge 11 lies against the inner wall 6 and against the outer wall 7. The annular channel 5 is thereby closed with the circumferential edge 11 of the closing cover 3.

The closing cover 3 can be metallic and connected or respectively joined at the circumferential edge 11 with the inner wall 6 and the outer wall 7 in a fluid-tight materially connected manner. The closing cover 3 can thus be, for example, soldered with the coaxial tube 2. Through the materially connected connecting, the annular channel 5 can be separated from the core channel 4 in a fluid-tight manner. The coaxial tube 2 can be accordingly closed at the longitudinal end side with the single closing cover 3 in a pressure-resistant and process-reliable manner.

Figure 4:
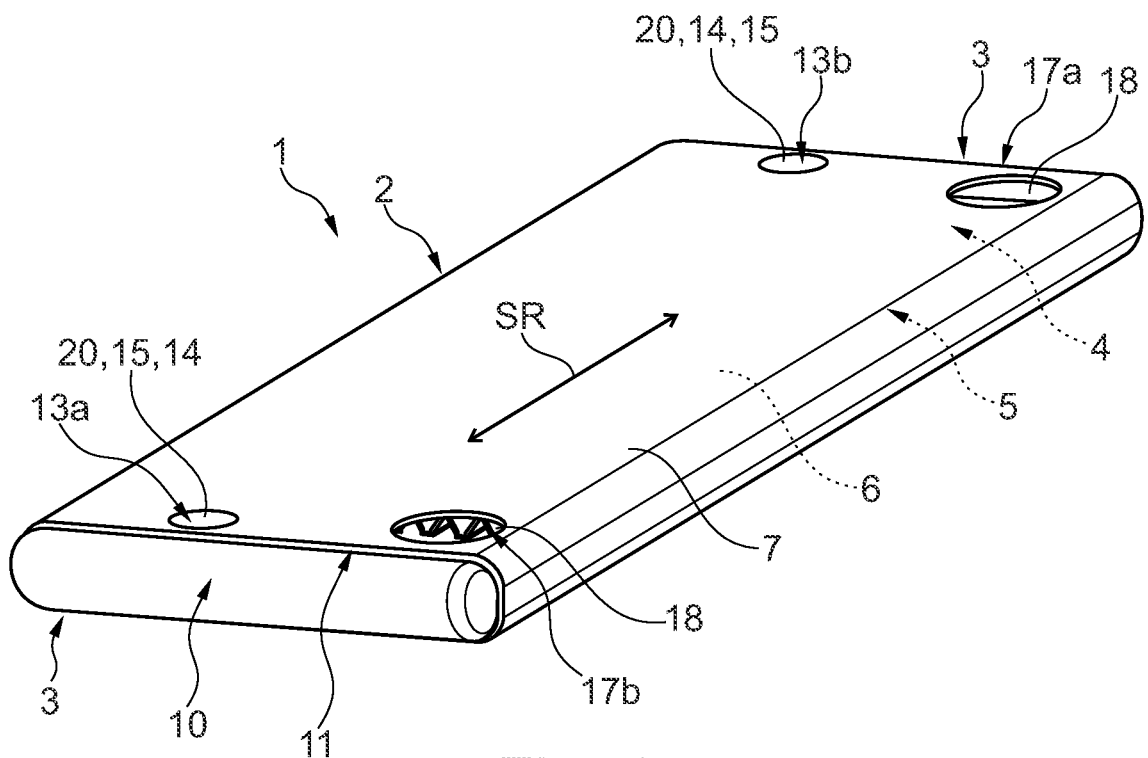
FIG. 4 shows a view of the coaxial tube arrangement according to the invention in a second embodiment.
Figure 5:
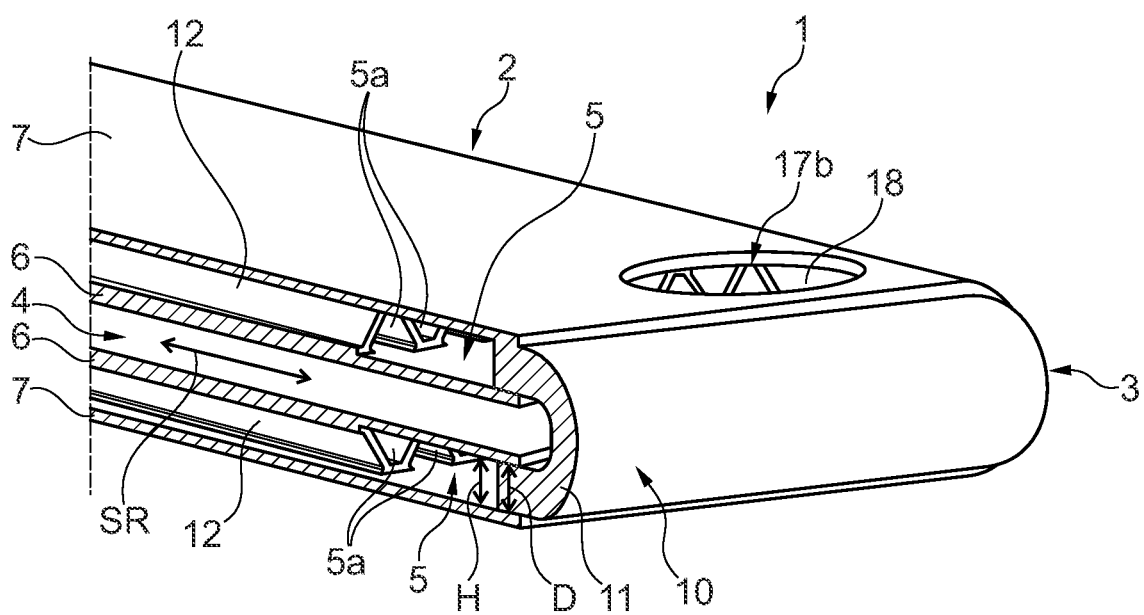
FIG. 5 shows a sectional view of the coaxial tube arrangement according to the invention in the second embodiment.
Figure 6:
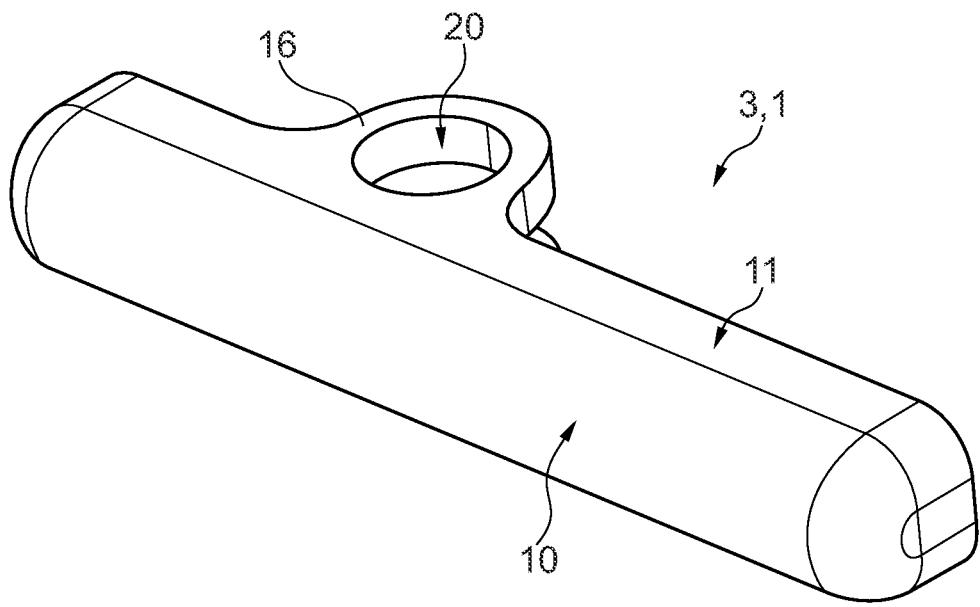
FIGS. 6 and 7 show views of the closing cover of the coaxial tube arrangement according to the invention in the second embodiment.
Figure 7:
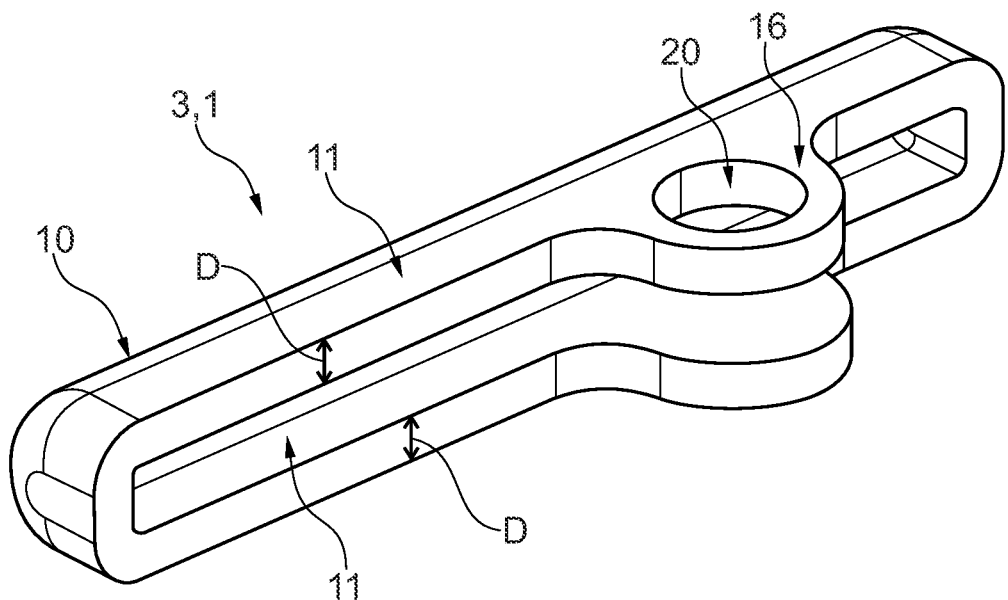

FIG. 4-7 show the coaxial tube arrangement 1 according to the invention in a second embodiment. The not directly visible elements in FIG. 4-7 are drawn by broken lines. FIG. 4 shows a view of the coaxial tube arrangement 1 and FIG. 5 shows a sectional view of the coaxial tube arrangement 1 in a plane aligned parallel to the flow direction SR. FIG. 6 and FIG. 7 show views of the closing cover 3 for the coaxial tube arrangement 1. In the following, only the differences between the first embodiment in FIG. 1-3 and the second embodiment of the coaxial tube arrangement in FIG. 4-7 are entered into separately. Otherwise, the first embodiment in FIG. 1-3 and the second embodiment in FIG. 4-7 of the coaxial tube arrangement 1 coincide.

Differing from the first embodiment, the coaxial tube arrangement 1 has two closing covers 3 here, which close the coaxial tube 2 on both sides. Also in the second embodiment, the thickness D of the circumferential edge 11 corresponds to the height H of the annular channel 5, and the respective closing cover 3 with the circumferential edge 11 is pushed in in part into the annular channel 5 in flow direction SR. Thereby, the annular channel 5 of the coaxial tube 2 is closed and is separated from the core channel 4 in a fluid-tight manner. The coaxial tube arrangement 1 forms here a heat exchanger block for the heat exchanger.

In the second embodiment of the coaxial tube arrangement 1, the coaxial tube 2 has a cross-section differing from the first embodiment. Here, the inner wall 6 and the outer wall 7 are formed in a rectangular manner, wherein edges of the inner wall 6 and of the outer wall 7, aligned parallel to the flow direction SR, are rounded.

Differing from the first embodiment, no rib portions are formed in the core channel 4 and no ribs are formed in the annular channel 5. In the annular channel 5, on the other hand, two separate turbulence inserts 12 are arranged, which divide the annular channel 5 into the several partial channels 5a which are parallel to one another. The turbulence insert 12 in addition establishes the inner wall 6 and the outer wall 7 spaced apart from one another. The turbulence inserts 12 can be metallic and connected or respectively joined in a materially connected manner with the inner wall 6 and/or with the outer wall 7. The turbulence inserts 12 can thus be, for example, soldered with the inner wall 6 and/or the outer wall 7.

With reference to FIG. 4, in the second embodiment the coaxial tube arrangement 1 has a core channel inlet 13a and a core channel outlet 13b for the first fluid. For the core channel inlet 13a and the core channel outlet 13b, an inner wall opening 14 is formed here in the inner wall 6, and respectively an outer wall opening 15 in the outer wall 7. With reference to FIG. 6 and FIG. 7, in addition the respective closing cover 3 for the core channel inlet 13a and for the core channel outlet 13b respectively has a through-opening 20. When the closing cover 3 is pushed into the annular channel 5 of the coaxial tube 2, the inner wall opening 14, the through-opening 20 and the outer wall opening 14 thus lie over one another transversely to the flow direction SR, so that a fluidic connection is formed from the exterior into the core channel 4.

With reference to FIG. 4 and FIG. 5, the coaxial tube arrangement 1 has in the second embodiment an annular channel inlet 17a and an annular channel outlet 17b. For the annular channel inlet 17a and the annular channel outlet 17b, an opening 18 is formed respectively in the outer wall 7.

With reference to the configuration of the core channel inlet 13a or respectively of the core channel outlet 13b and of the annular channel inlet 17a or respectively of the annular channel outlet 17b, reference is also made to FIG. 10. FIG. 10 relates to a differing embodiment of the coaxial tube arrangement 1 wherein, however, the configuration of the core channel inlet 13a or respectively of the core channel outlet 13b and of the annular channel inlet 17a or respectively of the annular channel 17b in this differing embodiment is identical to the second embodiment.

Figure 8:
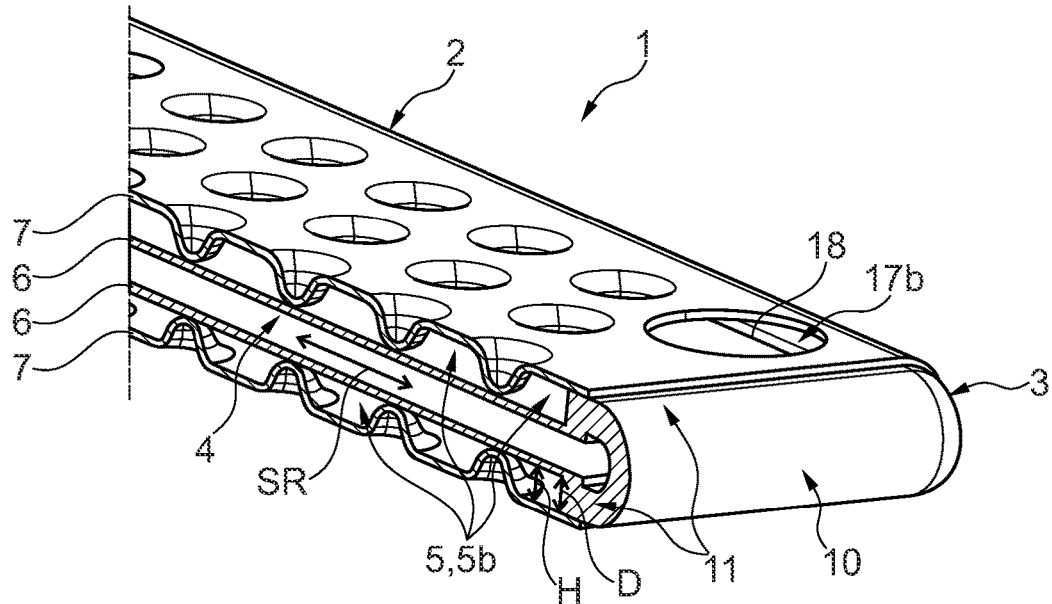
FIG. 8 shows a sectional view of the coaxial tube arrangement according to the invention in a third embodiment.
Figure 9:
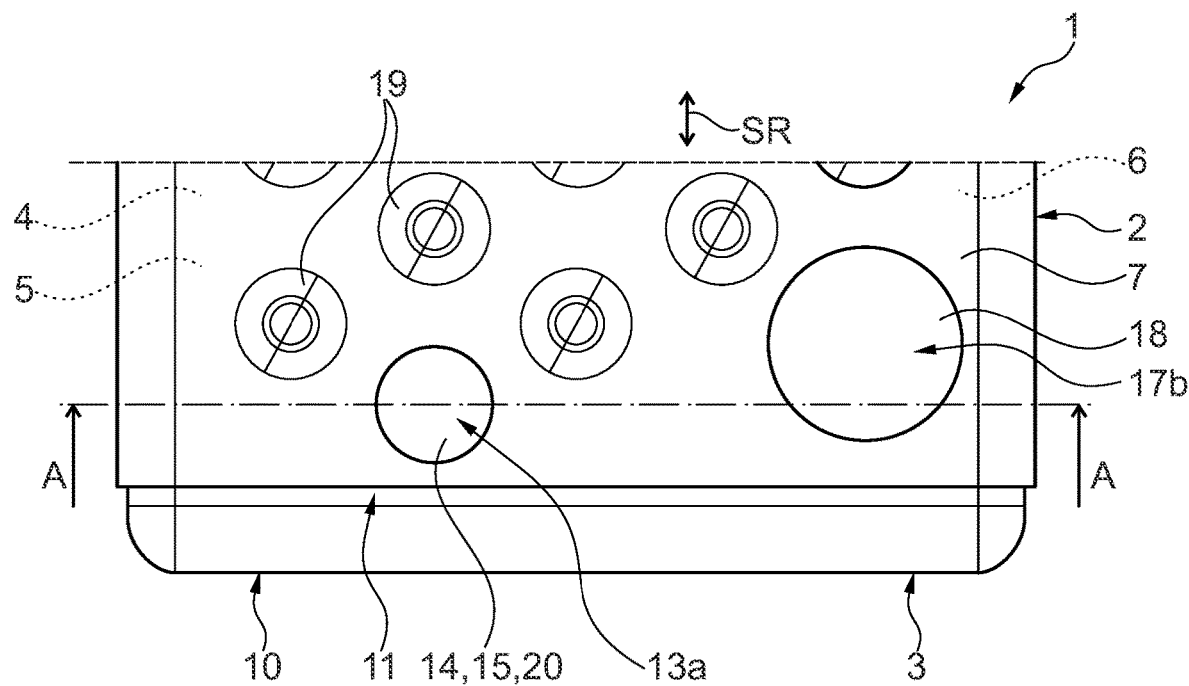
FIG. 9 shows a partial view of the coaxial tube arrangement according to the invention in the third embodiment.

FIG. 8-10 show the coaxial tube arrangement 1 in a third embodiment. The elements which are not directly visible in FIG. 8-10 are drawn with broken lines. FIG. 8 shows a sectional view of the coaxial tube arrangement 1 in a plane aligned parallel to the flow direction SR. FIG. 9 shows a partial view of the coaxial tube arrangement 1. FIG. 10 shows a sectional view of the coaxial tube arrangement 1 in a section plane A-A shown in FIG. 9. In the following, the differences between the second embodiment in FIG. 4-7 and the third embodiment in FIG. 8-10 of the coaxial tube arrangement 1 are entered into separately. Otherwise, the second embodiment in FIG. 4-7 and the third embodiment in FIG. 8-10 of the coaxial tube arrangement 1 coincide.

Differing from the second embodiment in FIG. 4-7, the coaxial tube arrangement 1 in the third embodiment has no separate turbulence inserts 12. On the other hand, in the outer wall 7 several nubs 19 are formed, which are directed from the outer wall 7 transversely to the flow direction SR to the inner wall 6, and rest onto the inner wall 6. Through the nubs 19, several flow paths 5b are formed in the annular channel 5, which improve the heat exchange of the two fluids in the annular channel 5 and the core channel 4.

In FIG. 10 the configuration of the core channel inlet 13a or respectively of the core channel outlet 13b and of the annular channel inlet 17a or respectively of the annular channel outlet 17b can be seen particularly readily. This configuration, related to the third embodiment, is identical to the second embodiment in FIG. 4-7.

The invention claimed is:

1. A coaxial tube arrangement for a heat exchanger, comprising:
    a coaxial tube including an inner core channel and an outer annular channel;
    at least one closing cover closing the coaxial tube at a longitudinal end side;
    the at least one closing cover having a base region and a circumferential edge, the base region aligned transversely to a flow direction through the coaxial tube, the circumferential edge aligned with the flow direction and facing the coaxial tube;
    a thickness, which is defined transversely to the flow direction, of the circumferential edge is equal to or greater than a height of the annular channel, which is defined transversely to the flow direction; and
    wherein the circumferential edge of the at least one closing cover covers the annular channel transversely to the flow direction and separates the annular channel from the core channel in a fluid-tight manner.

2. The coaxial tube arrangement according to claim 1, wherein at least a portion of the circumferential edge of the at least one closing cover projects into the annular channel in flow direction.

3. The coaxial tube arrangement according to claim 1, wherein:
    the coaxial tube further includes an inner wall extending around an exterior of the core channel and an outer wall extending around an exterior of the annular channel; and
    at least a portion of the circumferential edge of the at least one closing cover is arranged between the inner wall and the outer wall transversely to the flow direction.

4. The coaxial tube arrangement according to claim 1, further comprising:
   a core channel inlet via which a fluid is flowable into the core channel; and
   a core channel outlet via which the fluid is flowable out from the core channel;
   wherein the coaxial tube further includes an inner wall and an outer wall, the inner wall defining an outer perimeter of the core channel, the annular channel defined by and between the inner wall and the outer wall;
   wherein the core channel inlet and the core channel outlet extend through the annular channel and into the core channel via a respective inner wall opening in the inner wall and via a respective outer wall opening in the outer wall.

5. The coaxial tube arrangement according to claim 4, wherein:
   the circumferential edge of the at least one closing cover is arranged between the outer wall and the inner wall;
   the circumferential edge includes at least one of (i) an inlet through-opening for the core channel inlet and (ii) an outlet through-opening for the core channel outlet;
   the inlet through-opening correlates with the respective inner wall opening and with the respective outer wall opening of the core channel inlet transversely to the flow direction; and
   the outlet through-opening correlates with the respective inner wall opening and with the respective outer wall opening of the core channel outlet transversely to the flow direction.

6. The coaxial tube arrangement according to claim 5, wherein the circumferential edge of the at least one closing cover extends around the respective inner wall opening and the respective outer wall opening of at least one of the core channel inlet and the core channel outlet and fluidically separates the annular channel from the at least one of the core channel inlet and the core channel outlet.

7. The coaxial tube arrangement according to claim 1, further comprising:
   an annular channel inlet via which a fluid is flowable into the annular channel; and
   an annular channel outlet for letting via which the fluid is flowable out from the annular channel;
   wherein the annular channel inlet and the annular channel outlet extend into the annular channel via a respective opening in an outer wall extending around an exterior of the annular channel.

8. The coaxial tube arrangement according to claim 1, further comprising at least one separate turbulence insert arranged in the annular channel, wherein:
   the at least one separate turbulence insert forms at least two partial channels in the annular channel; and
   the at least two partial channels extend parallel to one another.

9. The coaxial tube arrangement according to claim 1, further comprising at least one separate turbulence insert arranged in the core channel, wherein:
   the at least one separate turbulence insert forms at least two partial channels in the core channel; and
   the at least two partial channels extend parallel to one another.

10. The coaxial tube arrangement according to claim 1, wherein the coaxial tube is structured as at least one of an extruded profile and a welded tube.

11. The coaxial tube arrangement according to claim 1, wherein:
    the coaxial tube further includes an outer wall defining an outer perimeter of the annular channel;
    the outer wall includes at least two nubs projecting into the annular channel and forming at least two flow paths in the annular channel; and
    the at least two flow paths differ from one another.

12. The coaxial tube arrangement according to claim 1, wherein:
    the coaxial tube further includes an outer wall defining an outer perimeter of the annular channel;
    the outer wall includes at least two ribs projecting into the annular channel and forming at least two partial channels in the annular channel; and
    the at least two partial channels extend parallel to one another.

13. The coaxial tube arrangement according to claim 1, wherein:
    the coaxial tube further includes an inner wall defining an outer perimeter of the core channel;
    the inner wall includes at least two rib portions projecting into the core channel and forming at least two partial channels in the core channel; and
    the at least two partial channels extend parallel to one another.

14. A coaxial tube arrangement for a heat exchanger, comprising:
    a coaxial tube including:
       a core channel;
       an inner wall delimiting an outer perimeter of the core channel;
       an outer wall disposed radially spaced apart from the inner wall; and
       an annular channel disposed between and defined by the inner wall and the outer wall;
    at least one cover closing a longitudinal end of the coaxial tube, the at least one cover including:
       a base extending transversely to a flow direction through the coaxial tube; and
       a circumferential wall projecting from the base in the flow direction;
    wherein the circumferential wall has a thickness, which is defined transversely to the flow direction, that is equal to or greater than a height of the annular channel, which is defined transversely to the flow direction; and
    wherein the circumferential wall projects into the annular channel in the flow direction, closes the annular channel transversely to the flow direction, and separates the annular channel from the core channel in a fluid-tight manner.

15. The coaxial tube arrangement according to claim 14, further comprising (i) a core channel inlet via which a fluid is flowable into the core channel and (ii) a core channel outlet via which the fluid is flowable out from the core channel, wherein:
    the outer wall includes an outer wall inlet opening and an outer wall outlet opening;
    the inner wall includes an inner wall inlet opening and an inner wall outlet opening;
    the core channel inlet extends through the annular channel and into the core channel via the outer wall inlet opening and the inner wall inlet opening; and
    the core channel outlet extends through the annular channel and into the core channel via the outer wall outlet opening and the inner wall outlet opening.

16. The coaxial tube arrangement according to claim 15, wherein the circumferential wall includes at least one of:
an inlet through-opening via which the core channel inlet extends through the circumferential wall; and
an outlet through-opening via which the core channel outlet extends through the circumferential wall.

17. The coaxial tube arrangement according to claim 15, wherein:
the circumferential wall includes an inlet through-opening via which the core channel inlet extends through the circumferential wall;
the outer wall inlet opening, the inlet through-opening, and the inner wall inlet opening are arranged coaxially, collectively define the core channel inlet, and fluidically connect the core channel to an external environment of the coaxial tube; and
the circumferential wall extends between and abuts the inner wall and the outer wall fluidically separating the core channel inlet from the annular channel.

18. The coaxial tube arrangement according to claim 15, wherein:
the circumferential wall includes an outlet through-opening via which the core channel outlet extends through the circumferential wall;
the outer wall outlet opening, the outlet through-opening, and the inner wall outlet opening are arranged coaxially, collectively define the core channel outlet, and fluidically connect the core channel to an external environment of the coaxial tube; and
the circumferential wall extends between and abuts the inner wall and the outer wall fluidically separating the core channel outlet from the annular channel.

19. A coaxial tube arrangement for a heat exchanger, comprising:
a coaxial tube including:
a core channel;
an inner wall delimiting an outer perimeter of the core channel, the inner wall including an inner wall inlet opening and an inner wall outlet opening;
an outer wall disposed radially spaced apart from the inner wall, the outer wall including an outer wall inlet opening and an outer wall outlet opening; and
an annular channel disposed between and defined by the inner wall and the outer wall;
a first cover closing a first longitudinal end of the coaxial tube;
a second cover closing a second longitudinal end of the coaxial tube;
the first cover and the second cover each including:
a base extending transversely to a flow direction through the coaxial tube; and
a circumferential wall projecting from the base into the annular channel in the flow direction, closing the annular channel transversely to the flow direction, and separating the annular channel from the core channel in a fluid-tight manner;
the circumferential wall of the first cover including an inlet through-opening;
the circumferential wall of the second cover including an outlet through-opening;
wherein the outer wall inlet opening, the inlet through-opening, and the inner wall inlet opening are arranged coaxially and collectively define a core channel inlet via which a fluid is flowable into the core channel;
wherein the outer wall outlet opening, the outlet through-opening, and the inner wall outlet opening are arranged coaxially and collectively define a core channel outlet via which the fluid is flowable out from the core channel;
wherein the circumferential wall of the first cover extends between and abuts the inner wall and the outer wall fluidically separating the core channel inlet from the annular channel; and
wherein the circumferential wall of the second cover extends between and abuts the inner wall and the outer wall fluidically separating the core channel outlet from the annular channel.

20. The coaxial tube arrangement according to claim 19, further comprising (i) an annular channel inlet via which a second fluid is flowable into the annular channel and (ii) an annular channel outlet via which the second fluid is flowable out from the annular channel, wherein the outer wall includes:
an annular channel inlet opening via which the annular channel inlet extends into the annular channel; and
an annular channel outlet opening via which the annular channel outlet extends into the annular channel.

* * * * *